(12) United States Patent
Isoda

(10) Patent No.: US 8,092,063 B2
(45) Date of Patent: Jan. 10, 2012

(54) SHEET-SHAPED LIGHTGUIDE MEMBER AND ELECTRONIC DEVICE USING THE SAME

(75) Inventor: Hiroto Isoda, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 247 days.

(21) Appl. No.: 12/372,219

(22) Filed: Feb. 17, 2009

(65) Prior Publication Data

US 2009/0207631 A1   Aug. 20, 2009

(30) Foreign Application Priority Data

Feb. 19, 2008 (JP) ................... 2008-037808
Nov. 28, 2008 (JP) ................... 2008-305646

(51) Int. Cl.
*F21V 7/04* (2006.01)
(52) U.S. Cl. ........................ 362/608; 362/615
(58) Field of Classification Search ................. 362/608, 362/610–613, 615, 617–620
See application file for complete search history.

(56) References Cited

U.S. PATENT DOCUMENTS

| | | | |
|---|---|---|---|
| 5,649,754 A * | 7/1997 | Matsumoto | 362/618 |
| 6,425,673 B1 * | 7/2002 | Suga et al. | 362/613 |
| 7,066,634 B2 * | 6/2006 | Kitamura et al. | 362/616 |
| 7,108,416 B1 * | 9/2006 | Osawa | 362/618 |
| 7,517,129 B2 * | 4/2009 | Choi et al. | 362/617 |
| 2004/0246697 A1 * | 12/2004 | Yamashita et al. | 362/31 |
| 2006/0109681 A1 * | 5/2006 | Kim et al. | 362/606 |

FOREIGN PATENT DOCUMENTS

| | | |
|---|---|---|
| JP | 8-179130 A | 7/1996 |
| JP | 2000-292787 A | 10/2000 |
| JP | 2001-14920 A | 1/2001 |
| JP | 2001-167655 A | 6/2001 |

\* cited by examiner

*Primary Examiner* — Julie Shallenberger

(74) *Attorney, Agent, or Firm* — Brinks Hofer Gilson & Lione

(57) ABSTRACT

A sheet-shaped lightguide member includes a lightguide sheet having a first surface, a second surface opposite the first surface, and a peripheral edge surface a part of which is defined as a light entrance surface. At least one of the first and second surfaces has microscopic irregularities over the whole area thereof. The lightguide member is provided with a lightguide layer on a region of the at least one of the first and second surfaces. The lightguide layer defines a lightguide region in the at least one of the first and second surfaces retaining an exposed region as a light-emitting region. The lightguide layer is configured to guide the light received through the light entrance surface toward the light-emitting region.

3 Claims, 5 Drawing Sheets

(a)

(b)

[Fig. 1]
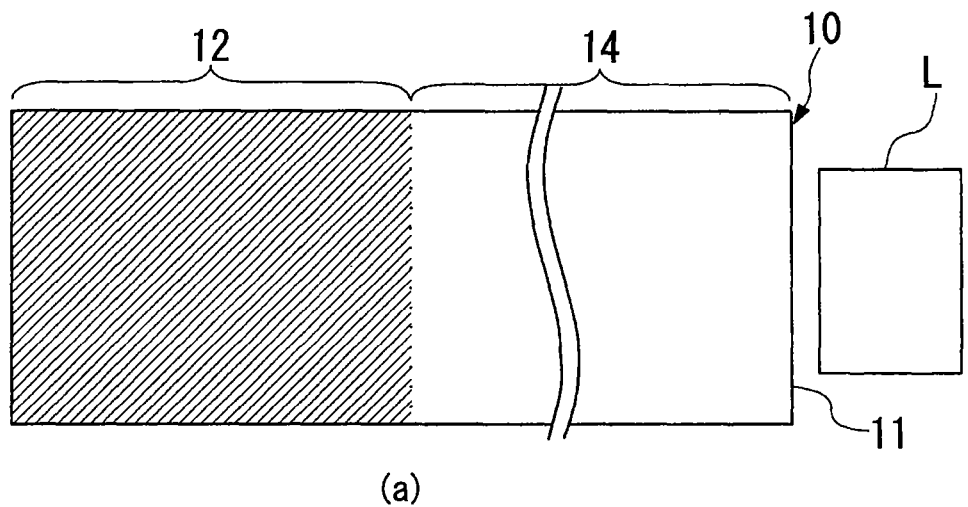
(a)
(b)
[Fig. 2]
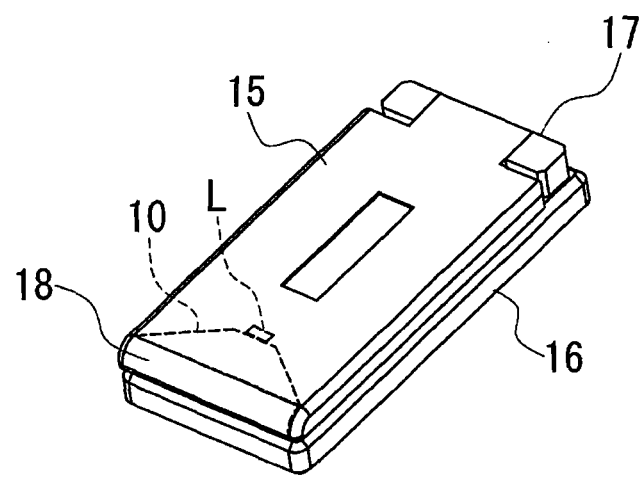

[Fig. 3]
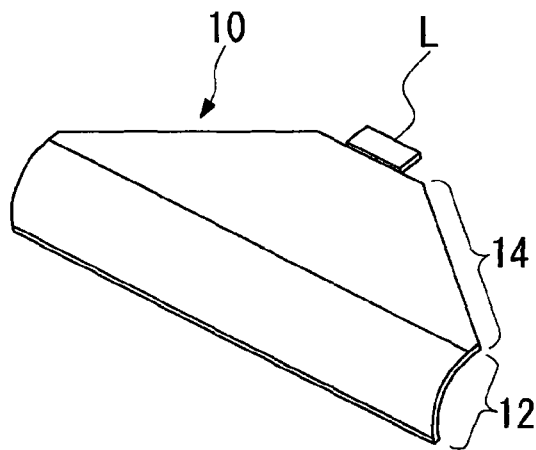
[Fig. 4]
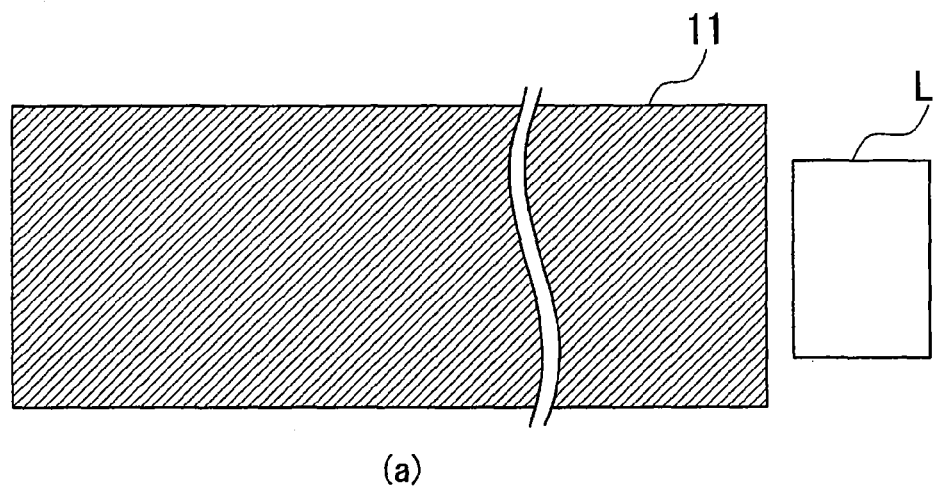
(a)
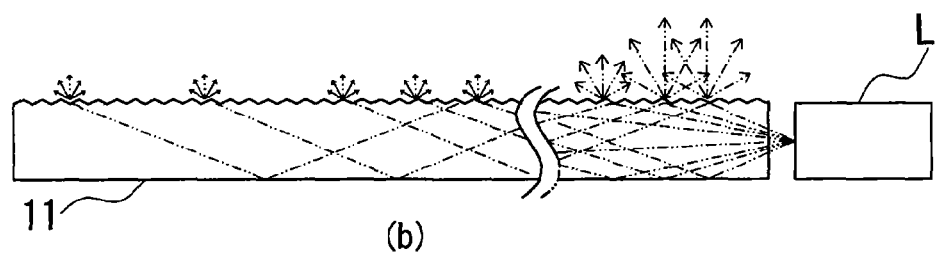
(b)

[Fig. 5]
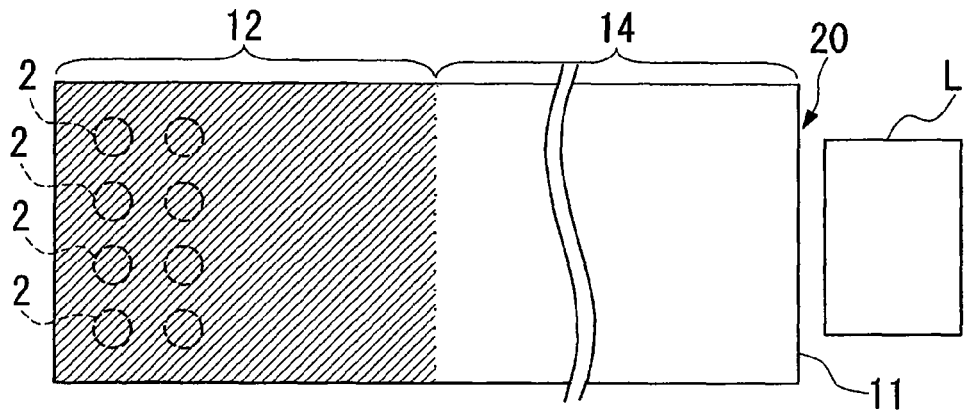
(a)
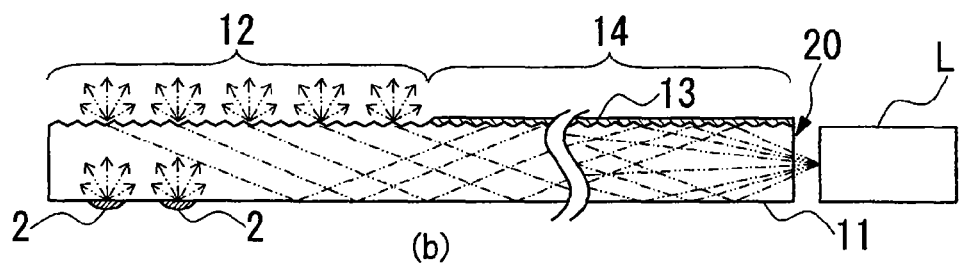
(b)
[Fig. 6]
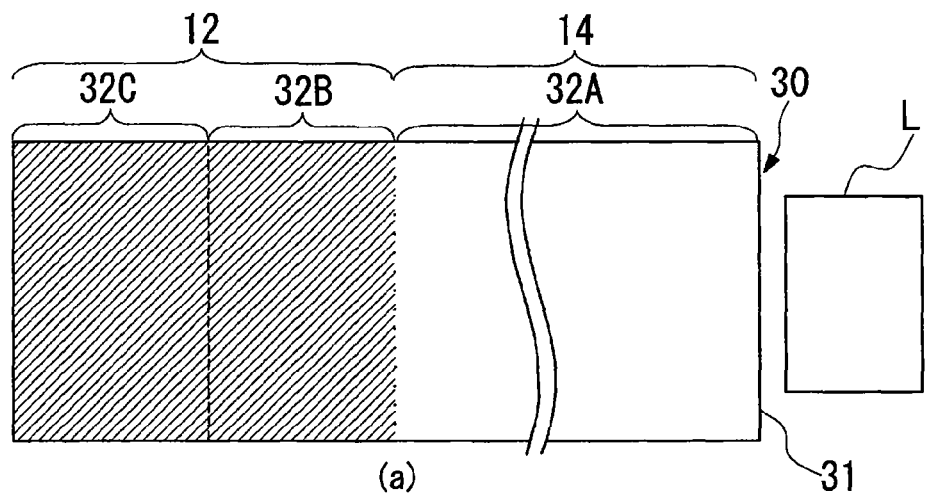
(a)
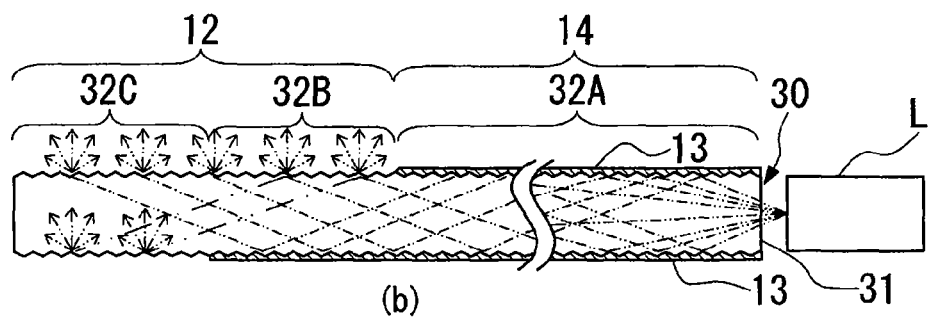
(b)

[Fig. 7]
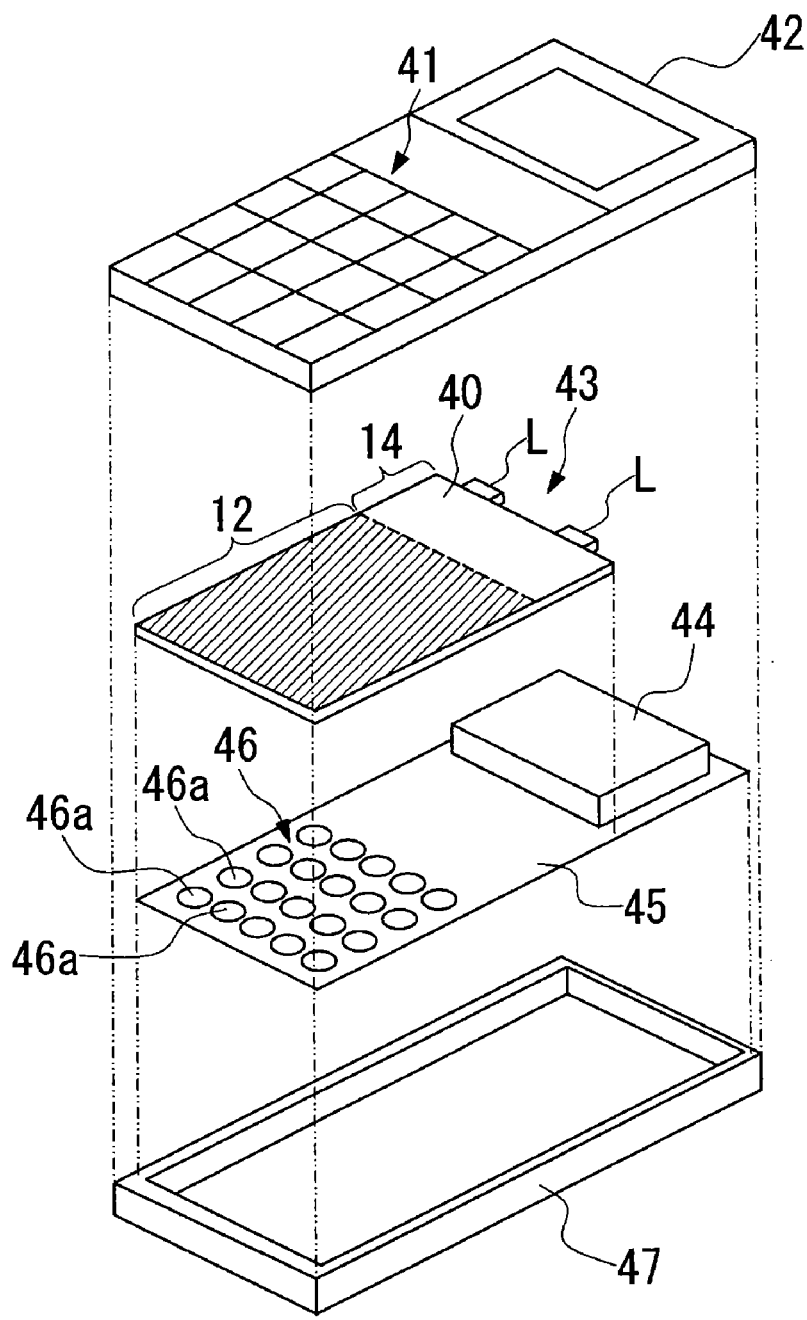

[Fig. 8]
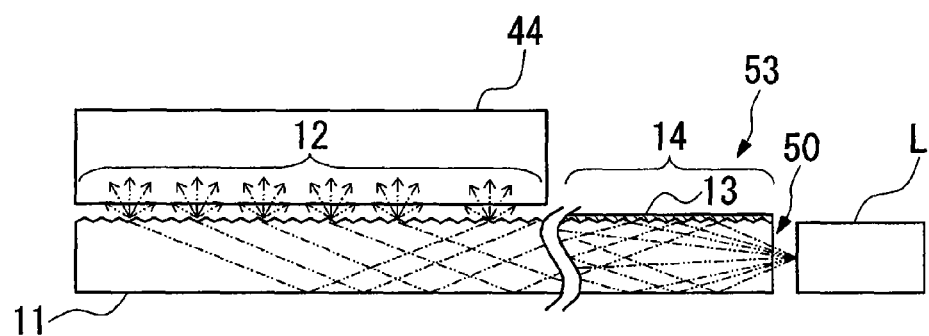
[Fig. 9]
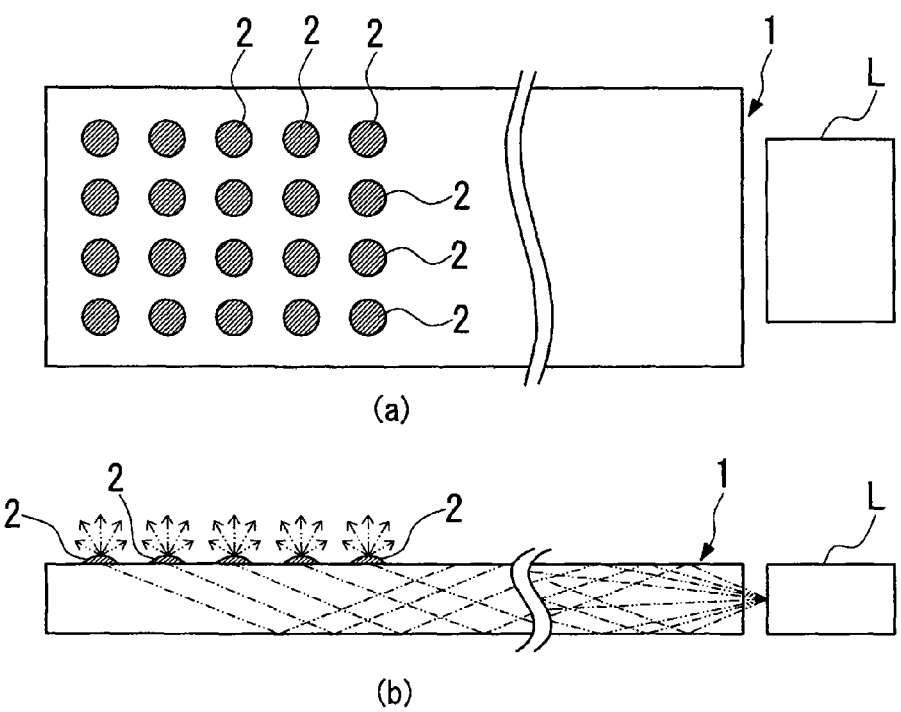
(a)
(b)

SHEET-SHAPED LIGHTGUIDE MEMBER AND ELECTRONIC DEVICE USING THE SAME

RELATED APPLICATIONS

This application claims priority under 35 U.S.C. §119 to Japanese Patent application No. JP2008-037808 filed on Feb. 19, 2008 and Japanese Patent application No. JP2008-305646 filed on Nov. 28, 2008, the entire contents of which are hereby incorporated by reference.

TECHNICAL FIELD

The present invention relates to a sheet-shaped lightguide member for illuminating, for example, an operation keypad of a mobile phone or the like from the underside thereof. The present invention also relates to an electronic device having the sheet-shaped lightguide member.

RELATED ART

Electronic devices such as mobile phones, personal digital assistants (PDAs), mobile personal computers (PCs) and mobile game machines employ devices to illuminate operation keys and a part of the devices from the underside thereof to facilitate operations in dark places, for instance.

For example, Japanese Patent Application Publication No. 2001-167655 proposes an operation panel device including a keypad having a plurality of operation keys, and a substrate disposed under the keypad and having a plurality of switching elements. The operation panel device further includes a pliable lightguide plate disposed between the keypad and the substrate. The lightguide plate receives light from an LED light source through a peripheral edge surface of the lightguide plate and emits the light toward the keypad.

Japanese Patent Application Publication No. 2001-014920 proposes a lightguide plate that receives light through an edge surface of the lightguide plate and illuminates a liquid crystal display panel from the underside of the liquid crystal display panel. In the lightguide plate, in order that the amount of light exiting from the light exiting surface (upper surface) of the lightguide plate may become uniform throughout the light exiting surface, a white ink is printed in a dot pattern on the lower surface of the lightguide plate in a region where the amount of light transmitted is relatively small to scatter light by the white ink to increase the amount of light exiting from the region in question.

Japanese Patent Application Publication No. Hei 08-179130 proposes a lightguide plate that receives light through an edge surface and illuminates a liquid crystal display panel from the underside of the liquid crystal panel. The lightguide plate has a large number of light-reflecting grooves on the lower surface of the lightguide plate and further has a light-scattering region formed by sandblasting in a desired area on the upper surface of the lightguide plate, the upper surface serving as a light-exiting surface to make the amount of exiting light uniform throughout the light-exiting surface.

Japanese Patent Application Publication No. 2000-292787 proposes a lightguide plate that illuminates a liquid crystal display panel from the underside of the liquid crystal display panel. The lightguide plate has an embossed light-diffusing region provided in dots on a lower surface of the lightguide plate, the lower surface opposite to an upper surface, and the upper surface serving as a light-exiting surface to emit light uniformly from the whole light-exiting surface.

SUMMARY OF THE INVENTION

The above-described conventional techniques, however, still have the following problems to be solved.

If a light-scattering region is formed on the upper surface of a lightguide plate by printing a dot pattern in white ink to adjust the amount of exiting light as in the related art, the dot pattern may be seen through an operation keypad or through a device incorporating the lightguide plate, which will impair the appearance of the device. In a case where light-scattering dots are formed on the upper surface of the lightguide plate by sandblasting or embossing, the production cost increases undesirably.

The present invention has been made in view of the above-described problems with the related art. Accordingly, an object of the present invention is to provide a sheet-shaped lightguide member adjusted in terms of the amount of light exiting from a light exiting surface of the lightguide member and capable of being disposed at the back of an operation panel or the like without impairing the appearance of the operation panel or the like and also capable of reducing the production cost. Another object of the present invention is to provide an electronic device having the sheet-shaped lightguide member of the present invention.

The present invention provides a sheet-shaped lightguide member including a lightguide sheet having a first surface, a second surface opposite the first surface, and a peripheral edge surface extending between the respective peripheral edges of the first and second surfaces. A part of the peripheral edge surface is defined as a light entrance surface for receiving light from a light source. The lightguide sheet guides the light received through the light entrance surface. At least one of the first and second surfaces is a light-scattering surface having microscopic irregularities over the whole area thereof. The sheet-shaped lightguide member further includes a lightguide layer that covers a region of the at least one of the first and second surfaces to define a lightguide region retaining an exposed region as a light-emitting region in the at least one of the first surface and second surface. The light-emitting region is positioned adjacent to the lightguide region at a side opposite to the light entrance surface. The lightguide layer is configured to guide the light received through the light entrance surface toward the light-emitting region.

In the sheet-shaped lightguide member of the present invention, the lightguide layer is provided in a region closer to the light entrance surface to guide light received through the light entrance surface toward the light-emitting region. Therefore, the sheet-shaped lightguide member can efficiently guide light toward the light-emitting region. The light-scattering surface in the light-emitting region diffuses the guided light and emits it to the outside. Because the sheet-shaped lightguide member is not provided with white dots as used in the above-described related art to scatteringly emit the guided light, the lightguide member can be used in an electronic device, e.g. a mobile phone, without impairing the appearance of the electronic device. In addition, because the microscopic irregularities for scattering light are formed over the whole area of the surface of the lightguide sheet, the irregularities can be formed by using a roller, for example. Accordingly, the production cost can be reduced in comparison with the above-described conventional technique in which dot-shaped light-scattering configurations are formed by embossing or the like.

Specifically, the light-scattering surface having microscopic irregularities may be an embossed surface.

The lightguide layer may be a layer that is formed by coating with a transparent ink and has a flat surface. In this case, the lightguide layer can totally reflect light guided through the sheet-shaped lightguide member by the surface thereof to guide it toward the light-emitting region.

The sheet-shaped lightguide member may further include a plurality of light-scattering dots disposed in a region of the other of the first and second surfaces that corresponds to the light-emitting region. The light-scattering dots scatter the guided light even more efficiently. Therefore, the light-scattering dots are provided in an area where an increased amount of exiting light is desired.

The light-scattering dots may be dots in white ink in the region of the other of the first and second surfaces.

The lightguide layer may be formed on each of the first and second surfaces. In this case, the lightguide layer on the second surface may extend farther away from the light source than the lightguide layer on the first surface.

With the above-described structure, the sheet-shaped lightguide member has,: a region in which the lightguide layer is formed on each of the first and second surfaces of the lightguide sheet; a region in which the lightguide layer is formed only on the second surface; and a light-emitting region in which the lightguide layer is not provided, the regions arranged in order from a side closer to the light source. Thus, the amount of light emitted from the sheet-shaped lightguide member can be properly adjusted at each region.

In addition, the present invention provides an electronic device including the above-described sheet-shaped lightguide member, which has the microscopic irregularities on the first surface, and a light source that supplies light to the sheet-shaped lightguide member through the light entrance surface. The electronic device further includes a light-transmitting member having a light-transmitting portion disposed to face the light-emitting region at the first surface of the sheet-shaped lightguide member. The light-transmitting portion is illuminated by light exiting from the light-emitting region and transmits the light.

The electronic device of the present invention can eliminate dots of white ink or the like such as those disclosed in the aforementioned related art. In a case where light-scattering dots of white ink are provided in the present invention, the white ink dots are provided on the second surface opposite to the first surface. Therefore, the white ink dots will not impair the appearance of the electronic device.

Specifically, the light-transmitting member may be an operation keypad having a plurality of operation keys, or a liquid crystal display panel.

More specifically, the electronic device may have the following structure. The electronic device further includes a housing that accommodates the sheet-shaped lightguide member. The housing has a plane portion on the top thereof and a curved portion extending contiguously from the plane portion. The light-transmitting member constitutes the curved portion. The sheet-shaped lightguide member is disposed in the housing. The light-emitting region of the first surface is curved to face the curved portion. The lightguide region of the first surface is formed in a planar shape corresponding to the plane portion of the housing.

BRIEF DESCRIPTION OF THE DRAWINGS

FIG. 1 is a diagram illustrating a sheet-shaped lightguide member according to a first embodiment of the present invention and a light source that supplies light to the lightguide member, of which: part (a) is a plan view of the lightguide member and the light source; and part (b) is a side view thereof.

FIG. 2 is a perspective view of a mobile phone (electronic device) using the sheet-shaped lightguide member according to the first embodiment.

FIG. 3 is a perspective view showing a sheet-shaped lightguide member and a light source that are configured to be suitable for use in the mobile phone shown in FIG. 2.

FIG. 4 is a diagram illustrating a sheet-shaped lightguide member that does not have a lightguide layer (transparent ink layer) as provided in the first embodiment for the purpose of comparatively explaining the way in which light from the light source is guided and emitted in the sheet-shaped lightguide member according to the first embodiment, of which: part (a) is a plan view of the lightguide member; and part (b) is a side view thereof.

FIG. 5 is a diagram illustrating a sheet-shaped lightguide member according to a second embodiment of the present invention and a light source that supplies light to the lightguide member, of which: part (a) is a plan view of the lightguide member and the light source; and part (b) is a side view thereof.

FIG. 6 is a diagram illustrating a sheet-shaped lightguide member according to a third embodiment of the present invention and a light source that supplies light to the lightguide member, of which: part (a) is a plan view of the lightguide member and the light source; and part (b) is a side view thereof.

FIG. 7 is a schematic exploded perspective view of a mobile phone using a sheet-shaped lightguide member according to the present invention.

FIG. 8 is a conceptual sectional side view showing a sheet-shaped lightguide member according to the present invention as used as a backlight unit for a liquid crystal display panel.

FIG. 9 is a diagram illustrating an example of conventional sheet-shaped lightguide members, of which: part (a) is a plan view of the lightguide member; and part (b) is a side view thereof.

DETAILED DESCRIPTION OF THE INVENTION

A first embodiment of the sheet-shaped lightguide member and electronic device according to the present invention will be explained below with reference to FIGS. 1 to 4. It should be noted that the scale of the figures used in the following explanation is properly changed to show each constituent member in a recognizable size.

As shown in FIG. 1, a sheet-shaped lightguide member 10 according to the first embodiment has a lightguide sheet 11 having an upper surface (first surface), a lower surface (second surface) and a peripheral edge surface extending between the respective peripheral edges of the upper and lower surfaces. The lightguide sheet 11 guides light from a light source L supplied through the peripheral edge surface of the lightguide, and while doing so, it emits the light from the upper surface serving as a light exiting surface. The light exiting surface has been wholly embossed to scatter light guided through the lightguide sheet 11 when the light exits through the light exiting surface. A region of the light exiting surface closer to the light source L is provided with a lightguide layer 13 formed by coating the region with a transparent ink. Thus, the light exiting surface is divided into a lightguide region 14 covered by the lightguide layer 13 and a light-emitting region 12 not covered by the lightguide layer 13.

The lightguide sheet 11 may be prepared by various methods. If the lightguide sheet 11 is a flexible lightguide film made of a light-transmitting resin material, for example, which has a high pliability as a whole, a satin-textured release sheet is used in the sheeting process to prepare a sheet having a wholly embossed upper surface. It is also possible to prepare a lightguide sheet 11 comprising a silicone sheet, for example, by sheeting a silicone solution applied between two PET (polyethylene terephthalate) sheets to form a silicone layer sandwiched between the PET sheets and thereafter embossing the upper surface of the silicone layer by roll forming when the PET sheets are removed. In a case where a rigid film such as a polycarbonate or acrylic film is used as the lightguide sheet 11, an embossed surface may be formed, for example, by transferring irregularity configurations to the film using a roll die or the like.

The lightguide layer 13 is formed by printing a transparent ink of low viscosity on the embossed surface to fill the irregularities of the embossed surface to form a flat surface. It should be noted that the lightguide layer 13 includes a material having a refractive index same or lower than that of the lightguide sheet 11.

The lightguide layer 13 is disposed in a region of the embossed surface to fill the irregularities of the embossed surface and to form a mirror surface as at least a part of an upper surface of the lightguide layer. Thus, the lightguide layer 13 totally reflects light supplied from the light source L and guided through the lightguide sheet 11. That is, the light is not allowed to exit upward through the lightguide layer 13 but guided toward the light-emitting region 12. FIG. 4 shows a sheet-shaped lightguide member comprising only a lightguide sheet 11 without a lightguide layer 13 that fills the irregularities of the embossed surface, as a comparative example. In this case, a region closer to the light source L undesirably becomes a high-luminance region because the embossed surface scatters light exiting therethrough. Consequently, the amount of light reaching a region remote from the light source L decreases, resulting in a reduction in luminance. The problem is solved by this embodiment. That is, as shown in FIG. 1, in a region closer to the light source L, the flat upper surface of the lightguide layer 13 totally reflects light supplied from the light source L and guided through the lightguide sheet 11 and efficiently guides the light toward the light-emitting region 12. Accordingly, the luminance at the light-emitting region 12 can be increased.

The lightguide sheet 11 has an embossed surface all over the upper side thereof, which can be readily made by roll forming or the like without using a die.

The light source L is a white light-emitting diode (LED) mounted on a mounting substrate (not shown) for a light source and disposed adjacent to the peripheral edge surface of the sheet-shaped lightguide member 10. The white LED is, for example, a semiconductor light-emitting element mounted on a substrate and sealed with a resin material. The semiconductor light-emitting element is, for example, a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed, for example, by adding a YAG fluorescent substance into a silicone resin as a main component. The YAG fluorescent substance converts blue or ultraviolet light from the semiconductor light-emitting element into yellow light, and white light is produced by color mixing effect. It should be noted that the white LED is not limited to those described above, but various white LEDs are usable. That is, it is possible to adopt various combinations of light-emitting elements that emit different colors of light and various combinations of a light-emitting element and a fluorescent substance.

FIG. 2 shows a foldable mobile phone in which the sheet-shaped lightguide member 10 may be used. The mobile phone has an upper housing member 15 and a lower housing member 16 that are foldable relative to each other through a hinge 17 provided at the center of the mobile phone. The upper housing member 15 has a distal end portion formed of a transparent or a semitransparent material into a curved light-emitting part 18 that emits light when there is an incoming call, for example. The sheet-shaped lightguide member 10 used in the mobile phone has, as shown in FIG. 3, a trapezoidal plane-shaped lightguide region 14 and a curved light-emitting region 12. The lightguide member 10 is mounted in the upper housing member 15 and the light-emitting region 12 is disposed to face the light-emitting part 18.

A liquid crystal display panel (not shown) is provided at a side of the upper housing member 15 that faces the lower housing member 16. Operation keys (not shown) are provided at a side of the lower housing member 16 that faces the upper housing member 15.

A second embodiment of the sheet-shaped lightguide member and electronic device according to the present invention will be explained below with reference to FIG. 5. In the following explanation of the second embodiment, the same constituent elements as those described in the foregoing first embodiment are denoted by the same reference numerals as used in the first embodiment, and a description thereof is omitted herein.

The second embodiment differs from the first embodiment in that the sheet-shaped lightguide member 20, as shown in FIG. 5, has a plurality of dots 2 printed in white ink and formed in a region of the lower surface that corresponds to the other surface of the light-emitting region 12.

The dots 2 scatter light guided through the sheet-shaped lightguide member 20, and the light impinging on the dots 2 enhances light-emitting efficiency, when the light exits from the light-emitting region 12. Particularly, forming white ink dots 2 in a part of the light-emitting region 12 that is remote from the light source L where the luminance is likely to lower makes it possible to obtain a uniform luminance throughout the light-emitting region 12. In the second embodiment, the sheet-shaped lightguide member 20 scatteringly emits light from the light-emitting region 12. Therefore, the dots 2 are not easily seen from the outside when the sheet-shaped lightguide member 20 emits light.

Next, a sheet-shaped lightguide member according to a third embodiment of the present invention will be explained with reference to FIG. 6.

The third embodiment differs from the first embodiment in that the sheet-shaped lightguide member 30 has a lightguide sheet 31 whose upper and lower surfaces are both embossed surfaces, and that a lightguide region 14 provided with a lightguide layer 13 is formed on an area of each of the upper and lower surfaces of the lightguide sheet 31.

Specifically, the lightguide sheet 31 has a first region 32A, a second region 32B and a third region 32C disposed in order from a side thereof closer to the light source L. In the first region 32A, the lightguide region 14 is formed on each of the upper and lower surfaces of the lightguide sheet 31. In the second region 32B, the lightguide region 14 is formed only on the lower surface of the lightguide sheet 31. In the third region 32C, the lightguide region 14 is not formed on either of the upper and lower surfaces of the lightguide sheet 31.

Accordingly, the sheet-shaped lightguide member 30 guides light through the lightguide sheet 31 as follows. In the first region 32A, which is near the light source L, the lightguide layers 13 formed on the upper and lower surfaces, respectively, of the lightguide sheet 31 totally reflect light. That is, no light exits from the first region 32A. In the second region 32B, the lightguide layer 13 on the lower surface of the lightguide sheet 31 totally reflects light and guides it in a direction away from the light source L. Meanwhile, a part of the guided light exits from the upper surface of the lightguide sheet 31. In the third region 32C, the embossed upper and lower surfaces of the lightguide sheet 31 scatter light when it exits therefrom. Thus, the luminance can be adjusted at each of the second and third regions 32B and 32C of the light-emitting region 12.

FIG. 7 shows an electronic device, e.g. a mobile phone, which may use a sheet-shaped lightguide member according to the present invention arranged as stated above.

The electronic device includes an upper housing member 42, an operation key-illuminating device 43, a liquid crystal display panel 44, a substrate 45, and a lower housing member 47. The upper housing member 42 has an operation keypad 41 including a plurality of operation keys arranged on the operation keypad 41. The operation key-illuminating device 43 is disposed underneath the operation keypad 41. The liquid crystal display panel 44 and a switching part 46 are mounted on the substrate 45 and the switching part 46 faces the operation keypad 41. The lower housing member 47 accommodates the operation key-illuminating device 43 and the substrate 45.

The operation key-illuminating device 43 has the above-described light source L and a sheet-shaped lightguide member 40 having the light source L disposed at an end of the sheet-shaped lightguide member.

The operation keypad 41 has display parts (not shown) provided for the respective keys. The display parts have numerals, letters or other symbols displayed on the operation keypad 41 to enter a phone number, etc. The display parts are transparent or semitransparent and illuminated from below.

The liquid crystal display panel 44 is a transmissive or semitransmissive liquid crystal display panel. In the case of a semitransmissive liquid crystal display panel 44, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer. The semitransmissive liquid crystal display panel 44 further has a semitransmitting reflector having both light-transmitting and -reflecting functions, the semitransmitting reflector provided underneath the panel body. It should be noted that the liquid crystal display panel 44 has a liquid crystal backlight unit (not shown) disposed at the underside the liquid crystal display panel.

The switching part 46 comprises switching elements 46a, for example, dome switches or tact switches, installed on the substrate 45. When one operation key is depressed, the corresponding switching element 46a is pressed through the sheet-shaped lightguide member 40 to conduct a switching operation. It should be noted that electronic components (not shown), such as an IC that controls the mobile phone, and components for communications (not shown) such as an antenna member may be mounted on the substrate 45.

FIG. 8 shows an example in which a liquid crystal display panel 44 is illuminated by a backlight unit 53 having a sheet-shaped lightguide member 50 according to the present invention, which is arranged as stated above.

It should be noted that the present invention is not necessarily limited to the foregoing embodiments but can be modified in a variety of ways without departing from the scope of the present invention.

For example, the sheet-shaped lightguide member 10 in the first embodiment has an embossed surface on the upper side of the lightguide sheet 11. In this regard, an embossed surface may be formed on only the lower side of the lightguide sheet 11 or on each of the upper and lower sides of the lightguide sheet 11.

Although in the foregoing embodiments the lightguide layer 13 is formed by a transparent ink layer using a transparent ink, the transparent ink layer may be replaced with a semitransparent ink layer using a semitransparent ink to fill the irregularities of the embossed surface to provide a flat upper surface. For example, a semitransparent ink mixed with a scattering agent may be used to form the semitransparent ink layer.

Although the foregoing embodiments employ a lightguide sheet as the sheet-shaped lightguide member, a lightguide plate higher in hardness or rigidity than the sheet may be used.

Although in the foregoing embodiments the present invention may be applied to a mobile phone, the present invention may be also applied to other various electronic devices, e.g. personal digital assistants (PDAs), mobile personal computers (PCs), and mobile game machines.

What is claimed is:

1. A sheet-shaped lightguide member comprising:
  a lightguide sheet having a first surface, a second surface opposite the first surface, and a peripheral edge surface extending between respective peripheral edges of the first surface and second surface, a part of the peripheral edge surface being defined as a light entrance surface for receiving light from a light source, the lightguide sheet guiding the light received from the light source at the light entrance surface, at least one of the first surface and second surface being a light scattering surface having microscopic irregularities over a whole area thereof; and
  a lightguide layer uniformly provided on a region of the at least one of the first surface and second surface of the lightguide sheet to define the region as a lightguide region, and retaining an exposed region exposed from the lightguide layer as a light-emitting region in the at least one of the first surface and second surface, the light-emitting region being positioned adjacent to the lightguide region which is provided with the lightguide layer, the light guide region being positioned closer to the light entrance surface than the light-emitting region, and wherein the lightguide layer is a flat coating of transparent ink that totally reflects and guides the light received through the light entrance surface toward the light-emitting region.

2. The sheet-shaped lightguide member of claim 1, wherein the light scattering surface having microscopic irregularities is an embossed surface.

3. The sheet-shaped lightguide member of claim 1, wherein the light-emitting region is curved.

* * * * *